US012531274B2

(12) United States Patent
Shintani

(10) Patent No.: US 12,531,274 B2
(45) Date of Patent: Jan. 20, 2026

(54) MANUFACTURING METHOD OF BATTERY

(71) Applicant: TOYOTA JIDOSHA KABUSHIKI KAISHA, Toyota (JP)

(72) Inventor: Kodai Shintani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 660 days.

(21) Appl. No.: 17/857,456

(22) Filed: Jul. 5, 2022

(65) Prior Publication Data
US 2023/0051290 A1     Feb. 16, 2023

(30) Foreign Application Priority Data

Aug. 10, 2021 (JP) .................. 2021-130654

(51) Int. Cl.
*H01M 10/0585* (2010.01)
*H01M 10/0525* (2010.01)
*H01M 50/609* (2021.01)

(52) U.S. Cl.
CPC ... *H01M 10/0585* (2013.01); *H01M 10/0525* (2013.01); *H01M 50/609* (2021.01)

(58) Field of Classification Search
CPC .......... H01M 10/052; H01M 10/0525; H01M 10/0583; H01M 10/0585; H01M 50/103; H01M 50/609; H01M 50/627; H01M 50/636; Y10T 29/49108; Y10T 29/4911; Y10T 29/49115
See application file for complete search history.

(56) References Cited

U.S. PATENT DOCUMENTS

2005/0170243 A1   8/2005  Ozawa et al.
2011/0005050 A1*  1/2011  Shimura ............. H01M 50/673
                                                         29/730
(Continued)

FOREIGN PATENT DOCUMENTS

CN        105637679 A     6/2016
CN        105742526 A     7/2016
(Continued)

OTHER PUBLICATIONS

JP-2009170367-A translation from FIT database (Year: 2025).*

*Primary Examiner* — Jeffrey T Carley
*Assistant Examiner* — Joshua D Anderson
(74) *Attorney, Agent, or Firm* — Oliff PLC

(57) ABSTRACT

A manufacturing method of a battery includes: an injection step of injecting the electrolytic solution into the intermediate member via an unsealed portion; and a permeation step of causing the electrolytic solution to permeate the intermediate member. The electrode body includes a power generation element and a first collector terminal and a second collector terminal. The power generation element has a first side and a second side corresponding to long sides in the rectangular shape of the power generation element, and a third side and a fourth side corresponding to short sides in the rectangular shape of the power generation element. The first collector terminal and the second collector terminal are placed on the first side and on the second side, respectively. In the permeation step, the intermediate member is placed such that the first side is placed on a vertically lower side as a first arrangement state.

15 Claims, 5 Drawing Sheets

(56) References Cited

U.S. PATENT DOCUMENTS

| | | | | |
|---|---|---|---|---|
| 2013/0065111 A1* | 3/2013 | Kim | ................. | H01M 50/70 |
| | | | | 118/500 |
| 2014/0283371 A1* | 9/2014 | Tsukui | ............. | H01M 10/4228 |
| | | | | 29/593 |
| 2014/0335389 A1* | 11/2014 | Takahata | ............ | H01M 50/562 |
| | | | | 429/61 |
| 2016/0254523 A1* | 9/2016 | Tsukui | ............. | H01M 10/0481 |
| | | | | 29/623.1 |
| 2018/0175364 A1* | 6/2018 | Hong | ............... | H01M 50/609 |

FOREIGN PATENT DOCUMENTS

| JP | 2005-093261 A | | 4/2005 |
|---|---|---|---|
| JP | 2005-222787 A | | 8/2005 |
| JP | 2009170367 A | * | 7/2009 |
| JP | 2016-122495 A | | 7/2016 |

* cited by examiner

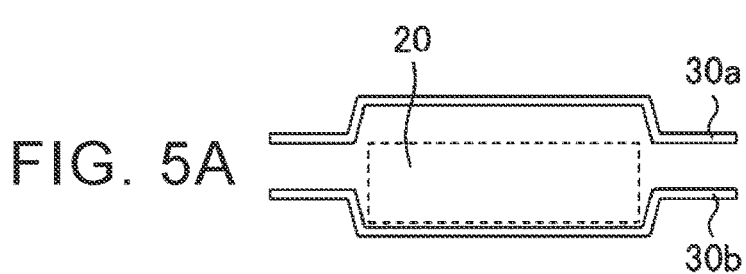
FIG. 5A
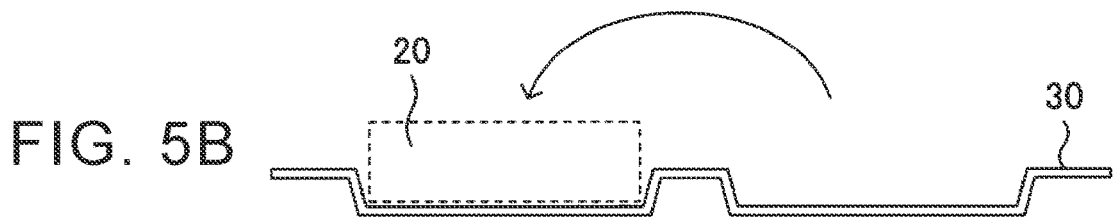
FIG. 5B
FIG. 6A
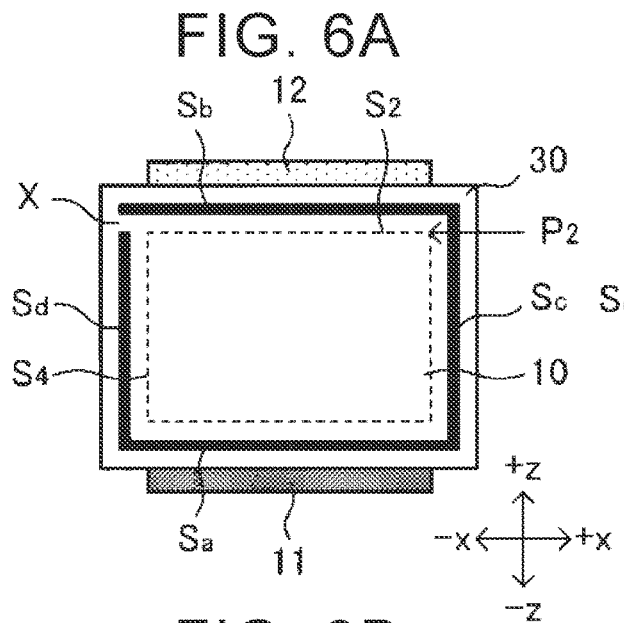
FIG. 6B
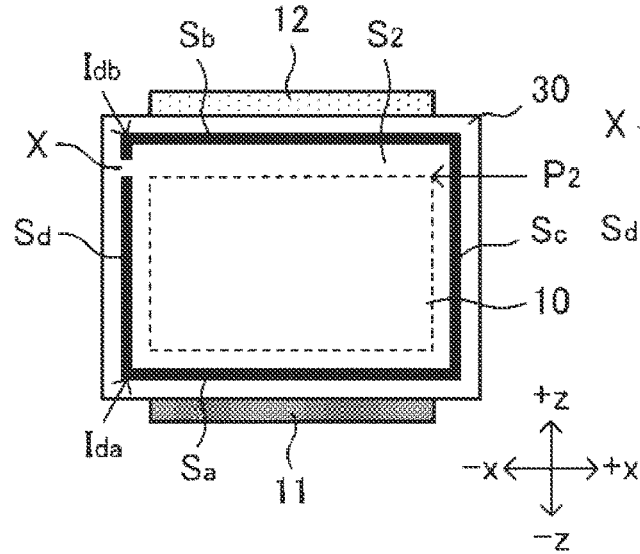
FIG. 6C
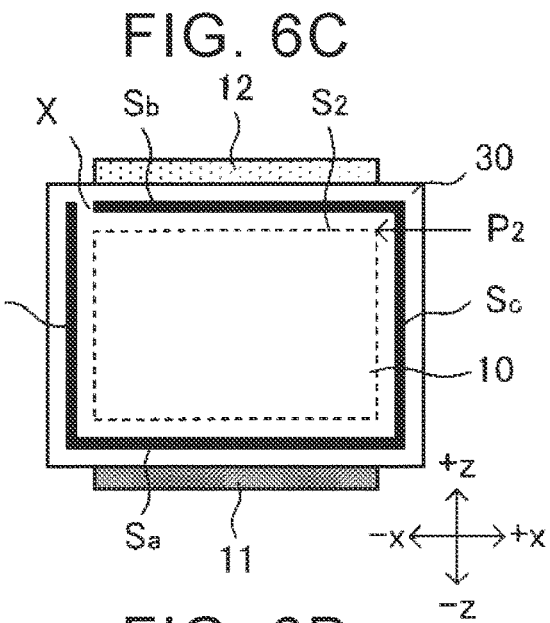
FIG. 6D
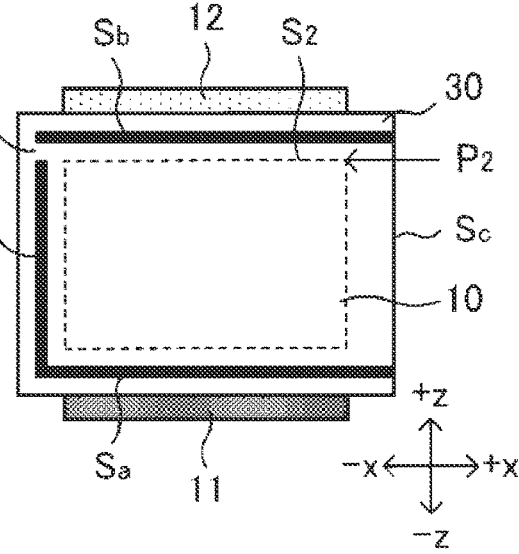

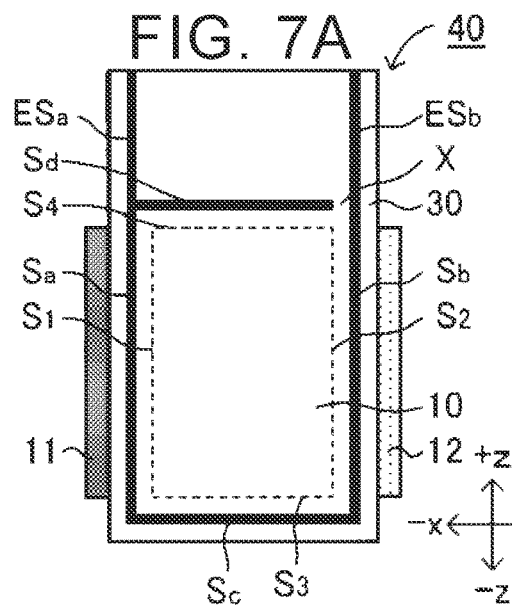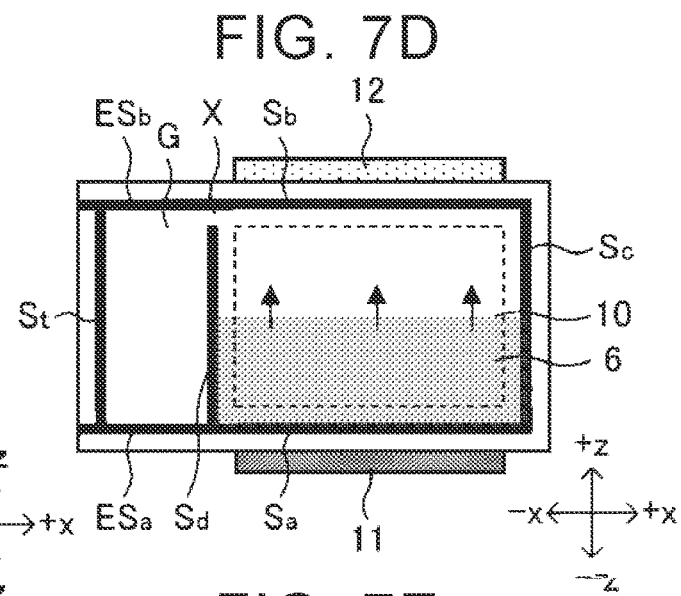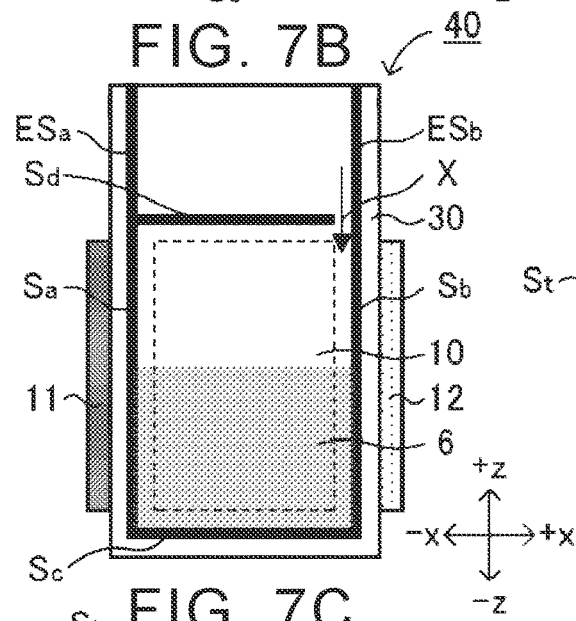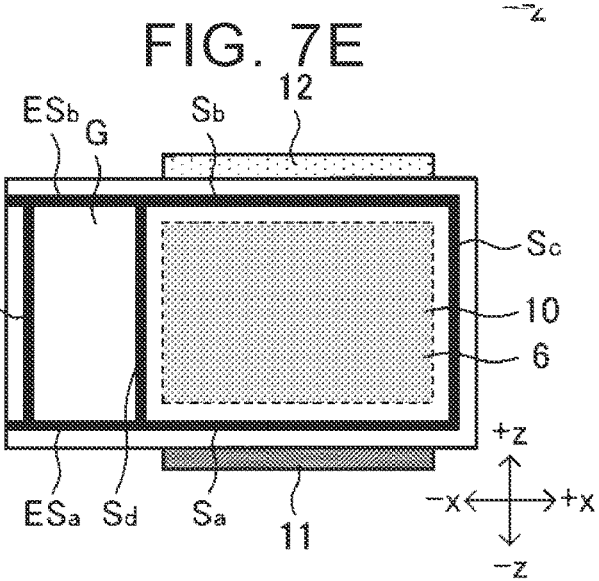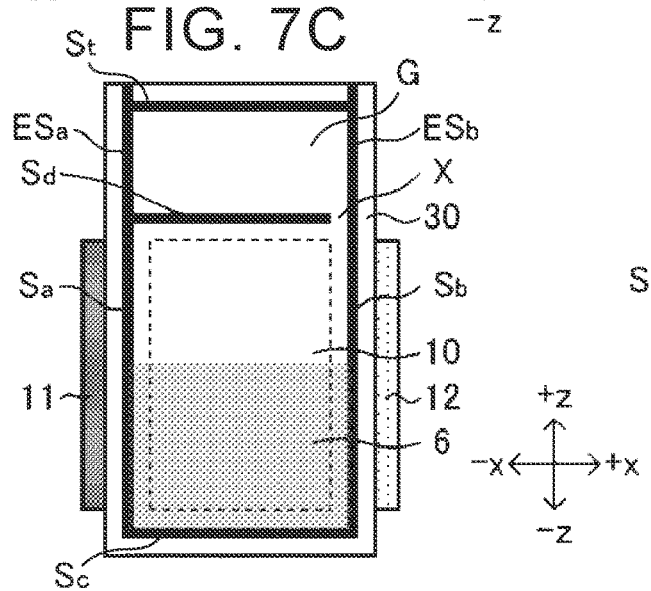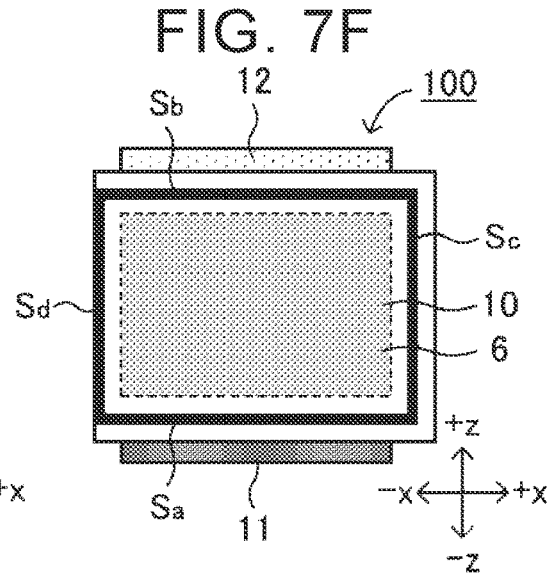

MANUFACTURING METHOD OF BATTERY

CROSS-REFERENCE TO RELATED APPLICATION

This application claims priority to Japanese Patent Application No. 2021-130654 filed on Aug. 10, 2021, incorporated herein by reference in its entirety.

BACKGROUND

1. Technical Field

This disclosure relates to a manufacturing method of a battery.

2. Description of Related Art

A battery such as a lithium-ion secondary battery includes an electrode body and an outer packaging body configured to seal the electrode body, for example. As a manufacturing method of such a battery, Japanese Unexamined Patent Application Publication No. 2016-122495 (JP 2016-122495 A) describes the following manufacturing method of a battery, for example. The manufacturing method includes: a step of preparing a temporarily sealed member; an injection step of injecting an electrolytic solution into a battery main body portion such that the temporarily sealed member is placed to stand in a state where an unsealed opening is opened to face upward and a distal end of an electrolytic-solution injection nozzle is placed at a position right above the unsealed opening; and an encapsulating step of joining, by heat sealing, the unsealed opening in the temporarily sealed member after the injection step.

SUMMARY

For example, an electrode body includes a power generation element having a rectangular shape in a plan view, and a positive collector terminal and a negative collector terminal connected to the power generation element. In the plan view, the positive collector terminal and the negative collector terminal may be placed in two long sides of the power generation element such that the positive collector terminal and the negative collector terminal face each other. In such a case, generally, an unsealed portion is provided in a short side (a side where the positive collector terminal and the negative collector terminal are not placed) in the power generation element, and an electrolytic solution is injected from the unsealed portion. However, since a permeation distance of the electrolytic solution is long, a permeation time is also long.

This disclosure is accomplished in view of the above circumstances, and a main object of this disclosure is to provide a manufacturing method of a battery that can reduce a permeation time of an electrolytic solution.

This disclosure provides a manufacturing method of a battery. The manufacturing method includes: a preparing step of preparing an intermediate member including an electrode body sealed by an outer packaging body and an unsealed portion via which an electrolytic solution is to be injected; an injection step of injecting the electrolytic solution into the intermediate member via the unsealed portion; and a permeation step of causing the injected electrolytic solution to permeate the intermediate member. The electrode body includes a power generation element having a rectangular shape in a plan view, and a first collector terminal and a second collector terminal connected to the power generation element. In the plan view, the power generation element has a first side and a second side corresponding to long sides in the rectangular shape of the power generation element, and a third side and a fourth side corresponding to short sides in the rectangular shape of the power generation element. The first collector terminal and the second collector terminal are placed on the first side and on the second side, respectively. In the permeation step, the electrolytic solution is caused to permeate the intermediate member in a first arrangement state (an arrangement state A) where the intermediate member is placed such that the first side is placed on a vertically lower side.

With this disclosure, when the arrangement state of the intermediate member during permeation of the electrolytic solution is set to the first arrangement state (the arrangement state A), it is possible to reduce a permeation time of the electrolytic solution.

In this disclosure, in the injection step, the electrolytic solution may be caused to be injected into the intermediate member in a second arrangement state (an arrangement state B) where the intermediate member is placed such that the third side is placed on the vertically lower side. The intermediate member may be rotated between the injection step and the permeation step so that the intermediate member is changed from the second arrangement state (the arrangement state B) to the first arrangement state (the arrangement state A).

In this disclosure, in the injection step, the electrolytic solution may be injected into the intermediate member in the first arrangement state (the arrangement state A).

In this disclosure, in the first arrangement state (the arrangement state A), the position of the unsealed portion may be higher than the position of the second side.

In this disclosure, in the plan view, the outer packaging body may include a first sealing portion placed outwardly from the first side, a second sealing portion placed outwardly from the second side, a third sealing portion placed outwardly from the third side, and a fourth sealing portion placed outwardly from the fourth side. The first sealing portion may be connected to a first extending portion extending across the fourth sealing portion from the power generation element. The second sealing portion may be connected to a second extending portion extending across the fourth sealing portion from the power generation element. The manufacturing method may include, between the injection step and the permeation step, a gas pocket forming step of forming a gas pocket constituted by the first extending portion, the second extending portion, the fourth sealing portion, and a temporarily sealing portion by forming the temporarily sealing portion connected to the first extending portion and the second extending portion.

In this disclosure, the manufacturing method may further include an inlet sealing step of sealing the unsealed portion after the permeation step.

The manufacturing method according to this disclosure yields an effect of reducing a permeation time of the electrolytic solution.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a schematic sectional view illustrating an outer packaging body in this disclosure;

FIG. 5B is a schematic sectional view illustrating an outer packaging body in this disclosure;

FIG. 6A is a schematic side view illustrating an intermediate member in this disclosure;

FIG. 6B is a schematic side view illustrating an intermediate member in this disclosure;

FIG. 6C is a schematic side view illustrating an intermediate member in this disclosure;

FIG. 6D is a schematic side view illustrating an intermediate member in this disclosure;

FIG. 7A is a schematic side view illustrating a manufacturing method of a battery in this disclosure;

FIG. 7B is a schematic side view illustrating a manufacturing method of a battery in this disclosure;

FIG. 7C is a schematic side view illustrating a manufacturing method of a battery in this disclosure;

FIG. 7D is a schematic side view illustrating a manufacturing method of a battery in this disclosure;

FIG. 7E is a schematic side view illustrating a manufacturing method of a battery in this disclosure; and FIG. 7F is a schematic side view illustrating a manufacturing method of a battery in this disclosure.

DETAILED DESCRIPTION OF EMBODIMENTS

The following describes a battery in this disclosure in detail with reference to the drawings. Each of the following drawings is illustrated schematically, and the magnitude and the shape of each part are exaggerated appropriately to facilitate understanding. Further, in each of the drawings, hatching indicating a section of a member is omitted appropriately.

Figure 1A:
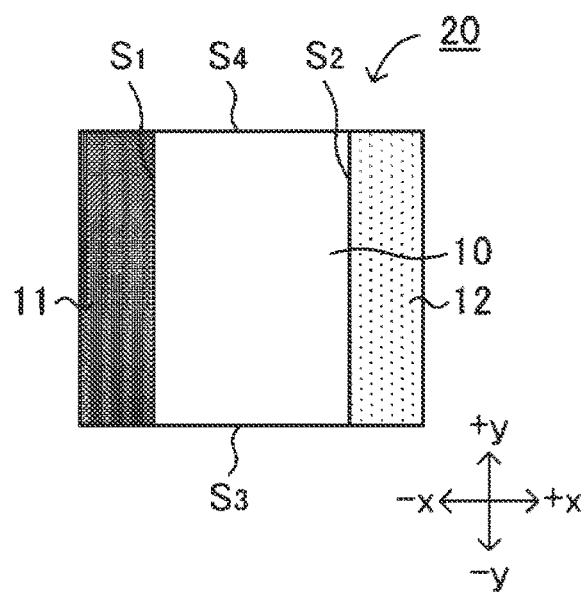
FIG. 1A illustrates schematic plan views illustrating a preparing step in this disclosure.
Figure 1C:
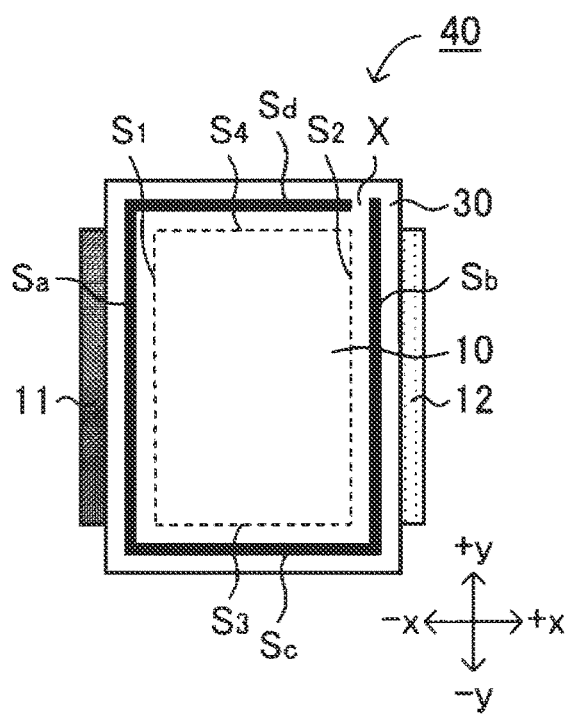
FIG. 1C illustrates schematic plan views illustrating a preparing step in this disclosure.
Figure 1B:
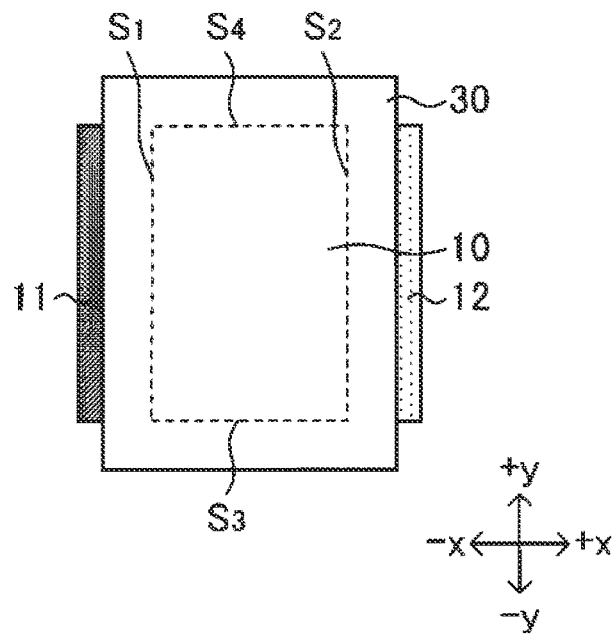
FIG. 1B illustrates schematic plan views illustrating a preparing step in this disclosure.

FIG. 1A to FIG. 1C illustrate schematic plan views illustrating a preparing step in this disclosure, and more specifically, FIG. 1A to FIG. 1C illustrate a step of preparing an intermediate member in this disclosure. First, as illustrated in FIG. 1A, an electrode body 20 is manufactured. The electrode body 20 includes a power generation element 10 having a rectangular shape in a plan view, a first collector terminal 11 connected to the power generation element 10, and a second collector terminal 12 connected to the power generation element 10. One of the first collector terminal 11 and the second collector terminal 12 is a positive collector terminal, and the other one of them is a negative collector terminal. Further, the power generation element 10 includes a first side $S_1$ and a second side $S_2$ corresponding to long sides in the rectangular shape of the power generation element 10. Further, the power generation element 10 includes a third side $S_3$ and a fourth side $S_4$ corresponding to short sides in the rectangular shape of the power generation element 10. Further, the first collector terminal 11 and the second collector terminal 12 are placed on the first side $S_1$ and on the second side $S_3$, respectively, and face each other via the power generation element 10.

Subsequently, as illustrated in FIG. 1B, an outer packaging body 30 is placed to cover the whole outer edge of the power generation element 10 in a plan view. Note that, although not illustrated in FIG. 1B, the outer packaging body 30 is placed to cover both principal surfaces (a front surface and a back surface) of the power generation element 10. Further, the first collector terminal 11 and the second collector terminal 12 are partially exposed from the outer packaging body 30.

Subsequently, as illustrated in FIG. 1C, a first sealing portion $S_a$ is formed in a region of the outer packaging body 30 that is placed outwardly from the first side $S_1$. That is, the first sealing portion $S_a$ is formed in a region of the outer packaging body 30 that is provided across the first side $S_1$ from the power generation element 10. Similarly, a second sealing portion $S_b$ is formed in a region of the outer packaging body 30 that is placed outwardly from the second side $S_2$, a third sealing portion $S_c$ is formed in a region of the outer packaging body 30 that is placed outwardly from the third side $S_3$, and a fourth sealing portion $S_d$ is formed in a region of the outer packaging body 30 that is placed outwardly from the fourth side $S_4$. Respective shapes of the first sealing portion $S_a$, the second sealing portion $S_b$, the third sealing portion $S_c$, and the fourth sealing portion $S_d$ are linear shapes, for example. Further, a first end part of the third sealing portion $S_c$ is connected to the first sealing portion $S_a$, and a second end part of the third sealing portion $S_c$ is connected to the second sealing portion $S_b$. In the meantime, a first end part of the fourth sealing portion $S_d$ is connected to the first sealing portion $S_a$, but a second end part of the fourth sealing portion $S_d$ is connected to the second sealing portion $S_b$. An unsealed portion X present between the second end part of the fourth sealing portion $S_d$ and the second sealing portion $S_b$ functions as an inlet via which an electrolytic solution is to be injected. Thus, an intermediate member 40 is provided such that the electrode body 20 is sealed by the outer packaging body 30, and the unsealed portion X via which the electrolytic solution is to be injected is provided.

Figure 2A:
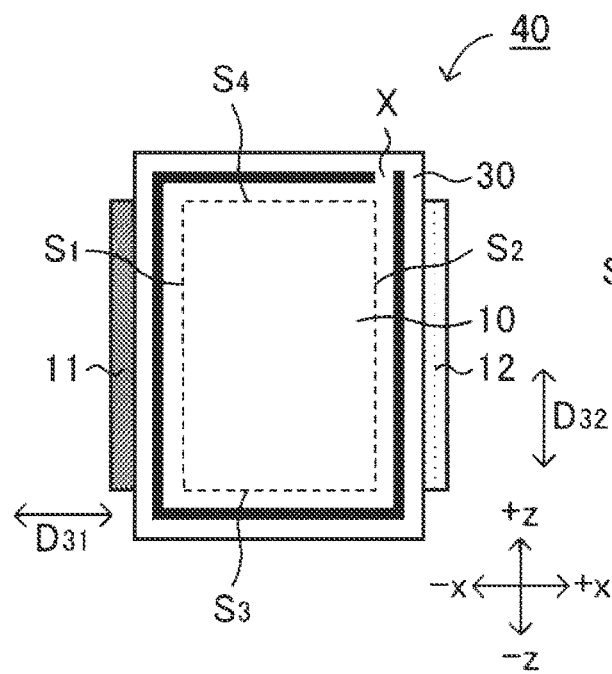
FIG. 2A illustrates schematic side views illustrating an injection step and a permeation step in this disclosure.
Figure 2C:
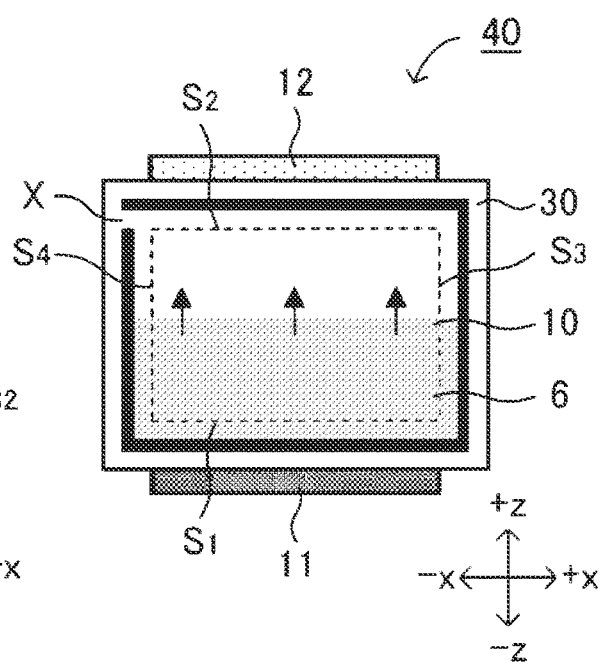
FIG. 2C illustrates schematic side views illustrating an injection step and a permeation step in this disclosure.
Figure 2B:
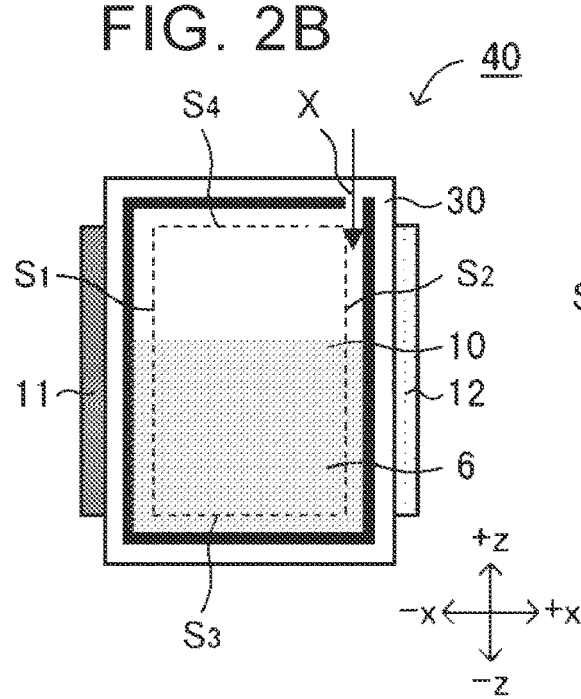
FIG. 2B illustrates schematic side views illustrating an injection step and a permeation step in this disclosure.
Figure 2D:
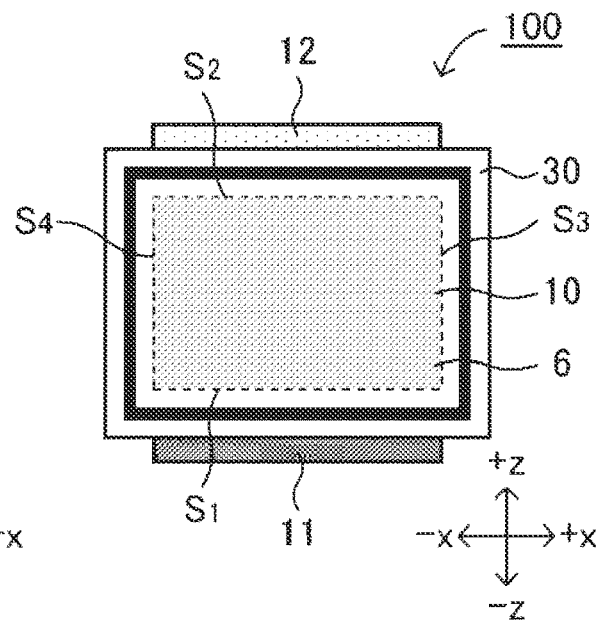
FIG. 2D illustrates schematic side views illustrating an injection step and a permeation step in this disclosure.

FIG. 2A to FIG. 2D illustrate schematic side views illustrating an injection step and a permeation step in this disclosure. As illustrated in FIG. 2A, the intermediate member 40 is placed such that the third side $S_3$ is placed on a vertically lower side. This second arrangement state is referred to as an arrangement state B. Then, as illustrated in FIG. 2B, while the arrangement state B is maintained, an electrolytic solution 6 is injected from the unsealed portion X. Then, as illustrated in FIG. 2C, the intermediate member 40 in which the electrolytic solution 6 is injected is placed such that the first side $S_1$ is placed on the vertically lower side. This first arrangement state is referred to as an arrangement state A. That is, the intermediate member 40 is rotated so that the intermediate member 40 is changed from the arrangement state B illustrated in FIG. 2B to the arrangement state A illustrated in FIG. 2C. By maintaining the arrangement state A, the electrolytic solution 6 permeates the whole intermediate member 40. Finally, as illustrated in FIG. 2D, a battery 100 is obtained by sealing the unsealed portion X.

Figure 3A:
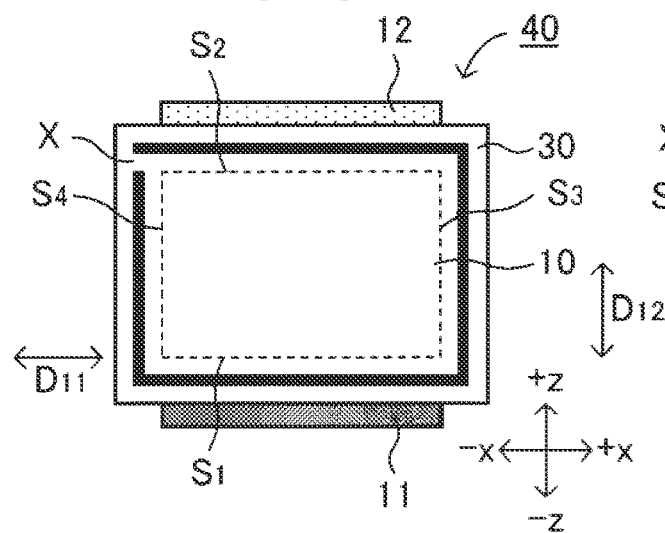
FIG. 3A illustrates schematic side views illustrating the injection step and the permeation step in this disclosure.
Figure 3C:
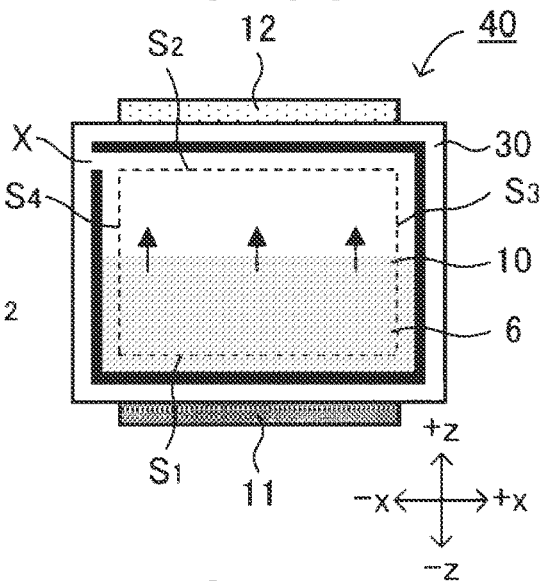
FIG. 3C illustrates schematic side views illustrating the injection step and the permeation step in this disclosure.
Figure 3B:
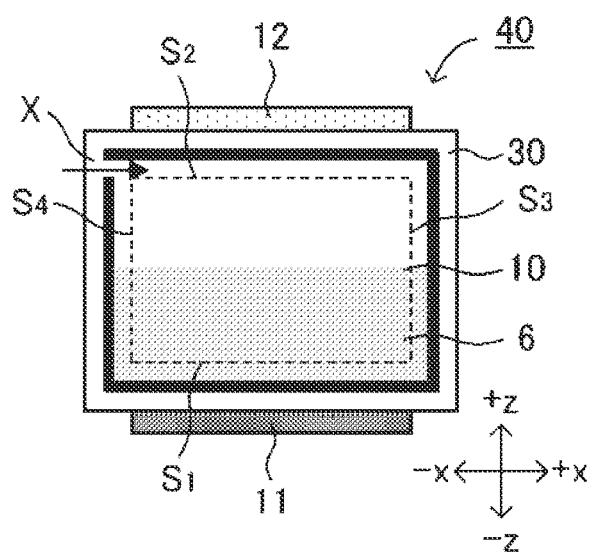
FIG. 3B illustrates schematic side views illustrating the injection step and the permeation step in this disclosure.
Figure 3D:
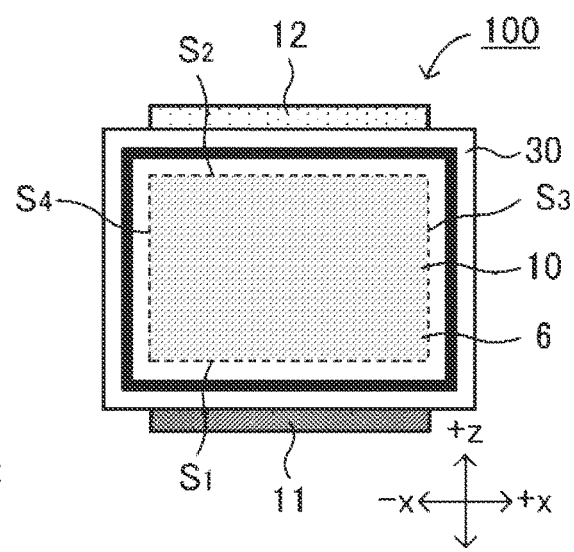
FIG. 3D illustrates schematic side views illustrating the injection step and the permeation step in this disclosure.

FIG. 3A to FIG. 3D illustrate schematic side views illustrating the injection step and the permeation step in this disclosure and illustrates steps different from those in FIG. 2A to FIG. 2D. As illustrated in FIG. 3A, the intermediate member 40 is placed such that the first side $S_1$ is placed on the vertically lower side (the arrangement state A). Subsequently, as illustrated in FIG. 3B, while the arrangement state A is maintained, the electrolytic solution 6 is injected from the unsealed portion X. Then, as illustrated in FIG. 3C, by maintaining the arrangement state A, the electrolytic solution 6 permeates the whole intermediate member 40. Finally, as illustrated in FIG. 3D, the battery 100 is obtained by sealing the unsealed portion X.

With this disclosure, when the arrangement state of the intermediate member during permeation of the electrolytic solution is set to the arrangement state A, it is possible to reduce a permeation time of the electrolytic solution. As described above, in a plan view, the positive collector terminal and the negative collector terminal may be placed in two long sides of the power generation element such that the positive collector terminal and the negative collector terminal face each other. An electrode body having such an arrangement is referred to as an electrode body α. The electrode body α can effectively achieve a cooling function in a case where the power generation element is cooled via the positive collector terminal and the negative collector terminal, for example.

In the meantime, in a case where the electrolytic solution is injected into the electrode body α, the unsealed portion X is provided in a short side (a side where the positive collector terminal and the negative collector terminal are not placed) in the power generation element 10 as illustrated in FIG. 2B, and the electrolytic solution is injected from the unsealed portion X. In that case, a permeation distance of the electrolytic solution depends on the length of the long side of the electrode body, and therefore, the permeation distance is relatively long, so that a permeation time is also long. In the meantime, in this disclosure, as illustrated in FIG. 2C, the intermediate member 40 in which the electrolytic solution 6 is injected is placed such that the first side $S_1$ is placed on the vertically lower side (the arrangement state A). In a case where the electrolytic solution 6 is caused to permeate the intermediate member 40 in the arrangement state A, the permeation distance of the electrolytic solution depends on the length of the short side of the electrode body, and therefore, the permeation distance is relatively short, so that the permeation time is also short. That is, it is possible to reduce the permeation time of the electrolytic solution. The permeation time is proportional to the square of an aspect ratio. Accordingly, in a case where the length of the long side relative to the length of the short side is 2, for example, when the manufacturing method of the battery in this disclosure is employed, it is possible to shorten the permeation time by ¼.

1. Preparing Step

The preparing step in this disclosure is a step of preparing an intermediate member including an electrode body sealed by an outer packaging body and an unsealed portion via which an electrolytic solution is to be injected. The intermediate member may be manufactured in person or may be purchased from others.

(1) Electrode Body

Figure 4A:
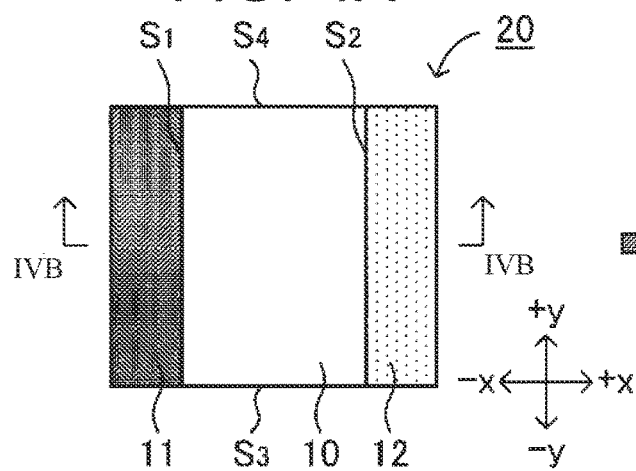
FIG. 4A illustrates a schematic plan view and a schematic sectional view illustrating an electrode body in this disclosure.
Figure 4B:
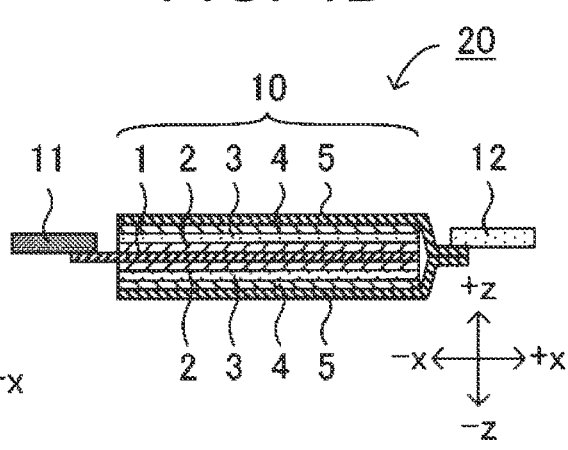
FIG. 4B illustrates a schematic plan view and a schematic sectional view illustrating an electrode body in this disclosure.

FIG. 4A is a schematic plan view illustrating the electrode body in this disclosure, and FIG. 4B is a sectional view taken along a line IVB-IVB in FIG. 4A. As illustrated in FIG. 4A, the electrode body 20 includes the power generation element 10 having a rectangular shape in a plan view, the first collector terminal 11 connected to the power generation element 10, and the second collector terminal 12 connected to the power generation element 10. The power generation element 10 includes the first side $S_1$ and the second side $S_2$ corresponding to the long sides in the rectangular shape of the power generation element 10, and the third side $S_3$ and the fourth side $S_4$ corresponding to the short sides in the rectangular shape of the power generation element 10. That is, the first side $S_1$ and the second side $S_2$ correspond to the long sides facing each other in the rectangular shape, and the third side $S_3$ and the fourth side $S_4$ correspond to the short sides facing each other in the rectangular shape.

The aspect ratio (long side/short side) of the power generation element is equal to or more than 1.1, for example, and the aspect ratio may be equal to or more than 1.5 or may be equal to or more than 2.0. In the meantime, the aspect ratio (long side/short side) of the power generation element is equal to or less than 10.0, for example, and may be equal to less than 5.0.

Further, as illustrated in FIG. 4A, the first collector terminal 11 and the second collector terminal 12 are placed to face each other via the power generation element 10. Further, the first collector terminal 11 is placed on the first side $S_1$, and the second collector terminal 12 is placed on the second side $S_2$. The first collector terminal 11 and the second collector terminal 12 are metal collector terminals, for example.

Further, as illustrated in FIG. 4B, the power generation element 10 includes a first electrode layer 2, a separator 3, a second electrode layer 4, and a second current collector 5 in this order along a +z direction from a first current collector 1. Similarly, the power generation element 10 includes the first electrode layer 2, the separator 3, the second electrode layer 4, and the second current collector 5 in this order along a -z direction from the first current collector 1. One of the first electrode layer 2 and the second electrode layer 4 is a positive electrode layer, and the other one of them is a negative electrode layer. The positive electrode layer contains at least a positive-electrode active material. The negative electrode layer contains at least a negative-electrode active material. The separator has cavities through which the electrolytic solution can pass. Further, the first current collector 1 and the first collector terminal 11 are electrically connected to each other. Similarly, the second current collector 5 and the second collector terminal 12 are electrically connected to each other.

It is preferable that the power generation element in this disclosure include a plurality of power generation units each including a first electrode layer, a separator, and a second electrode layer. In this case, the power generation units may be connected in parallel or may be connected in series.

(2) Outer Packaging Body

Generally, the outer packaging body in this disclosure is an outer packaging body of a laminating type. The outer packaging body of the laminating type has at least a structure in which a heat welding layer and a metal layer are laminated. Further, the outer packaging body may include a heat welding layer, a metal layer, and a resin layer in this order along the thickness direction of the outer packaging body. The material for the heat welding layer may be olefin-based resin such as polypropylene (PP) and polyethylene (PE), for example. The material for the metal layer may be aluminum, aluminum alloy, and stainless steel, for example. The material for the resin layer may be polyethylene terephthalate (PET) and nylon, for example.

As illustrated in FIG. 5A, the electrode body 20 may be sealed by use of a pair of outer packaging bodies 30a, 30b. That is, the electrode body 20 may be sealed such that the outer packaging body 30a is placed on a first principal surface side of the electrode body 20, and the outer packaging body 30b is placed on a second principal surface side of the electrode body 20. Further, as illustrated in FIG. 5B, the electrode body 20 may be sealed by folding a single outer packaging body 30.

(3) Sealing Portion and Unsealed Portion

The intermediate member in this disclosure includes a sealing portion in which the outer packaging body is welded. The sealing portion may be a part where outer packaging bodies facing each other are directly welded to each other or may be a part where outer packaging bodies facing each other are welded to each other via a collector terminal. Generally, the sealing portion is formed by heat sealing.

It is preferable that the outer packaging body in the intermediate member include a first sealing portion, a second sealing portion, a third sealing portion, and a fourth sealing portion as the sealing portion. The outer packaging body 30 illustrated in FIG. 1C includes the first sealing portion $S_a$, placed outwardly from the first side $S_1$. That is, the first sealing portion $S_a$ is formed in a region of the outer packaging body 30 that is placed across the first side $S_1$ from the power generation element 10. Further, the first sealing portion $S_a$ extends along the first side $S_1$. Similarly, the outer packaging body 30 includes the second sealing portion $S_b$ placed outwardly from the second side $S_2$, the third sealing portion $S_c$ placed outwardly from the third side $S_3$, and the fourth sealing portion $S_d$ placed outwardly from the fourth side $S_4$.

In the meantime, the intermediate member includes an unsealed portion via which the electrolytic solution is to be injected. The dimension of the unsealed portion is not limited in particular but may be a dimension that allows a nozzle for injecting the electrolytic solution to be inserted into the unsealed portion, for example. Further, as illustrated in FIG. 6A, in the arrangement state A, it is preferable that the position of the unsealed portion X be higher than a position $P_2$ of the second side $S_2$. This can restrain the electrolytic solution from flowing out from the intermediate member. Note that, in the arrangement state A, the position of the unsealed portion X may be higher than a middle point of the fourth side $S_4$. Further, as illustrated in FIG. 6A, the unsealed portion X may be placed on an extension line of the fourth sealing portion $S_d$. In the meantime, as illustrated in FIG. 6B, the unsealed portion X may be placed on a line segment that connects an intersecting point $I_{da}$ between the fourth sealing portion $S_d$ and the first sealing portion $S_a$ with an intersecting point $I_{db}$ between the fourth sealing portion $S_d$ and the second sealing portion $S_b$. Further, as illustrated in FIG. 6C, the unsealed portion X may be placed on an extension line of the second sealing portion $S_b$. Further, as illustrated in FIG. 3B, in a case where the electrolytic solution 6 is injected into the intermediate member 40 in the arrangement state A, the unsealed portion may be placed on the third side $S_3$ side.

Note that the sealing portion in this disclosure may be a part where the outer packaging body is folded. For example, as illustrated in FIG. 6I), the third sealing portion $S_c$ may be a folded portion obtained by folding the outer packaging body. Such a folded portion is formed by using the outer packaging body 30 illustrated in FIG. 5B, for example.

2. Injection Step

The injection step in this disclosure is a step of injecting the electrolytic solution into the intermediate member via the unsealed portion.

For example, as illustrated in FIG. 2A, the electrolytic solution may be injected into the intermediate member in a state (the arrangement state B) where the intermediate member 40 is placed such that the third side $S_3$ is placed on the vertically lower side. The state where "the third side is placed on the vertically lower side" indicates that the following conditions (i) and (ii) are satisfied.

(i) The angle formed between $D_{31}$ and $D_H$ is equal to or less than 45°.

(ii) The angle formed between $D_{32}$ and $D_V$ is equal to or less than 45°.

Here, as illustrated in FIG. 2A, $D_{31}$ is the extending direction of the third side $S_3$, and $D_{32}$ is a direction perpendicular to $D_{31}$. Further, $D_H$ is the horizontal direction, and $D_V$ is the vertical direction. Further, the angle formed between $D_{31}$ and $D_H$ may be equal to or less than 30°, may be equal to or less than 15", or may be equal to or less than 5". Further, the angle formed between $D_{32}$ and $D_V$ may be equal to or less than 30°, may be equal to or less than 15°, or may be equal to or less than 5°. Further, in a case where the electrolytic solution is injected into the intermediate member in the arrangement state B, the intermediate member is rotated between the injection step and the permeation step so that the intermediate member is changed from the arrangement state B to the arrangement state A.

For example, as illustrated in FIG. 3A, the electrolytic solution may be injected into the intermediate member in a state (the arrangement state A) where the intermediate member 40 is placed such that the first side $S_1$ is placed on the vertically lower side. The state where "the first side is placed on the vertically lower side" indicates that the following conditions (iii) and (iv) are satisfied.

(iii) The angle formed between $D_{11}$ and $D_H$ is equal to or less than 45°.

(iv) The angle formed between $D_{12}$ and $D_V$ is equal to or less than 45°.

Here, as illustrated in FIG. 3A, $D_{11}$ is the extending direction of the first side $S_1$, and $D_{12}$ is a direction perpendicular to $D_{11}$. Further, $D_H$ is the horizontal direction, and $D_V$ is the vertical direction. Further, the angle formed between $D_{11}$ and $D_H$ may be equal to or less than 30°, may be equal to or less than 15°, or may be equal to or less than 5°. Further, the angle formed between $D_{12}$ and $D_V$ may be equal to or less than 30°, may be equal to or less than 15", or may be equal to or less than 5".

A method of injecting the electrolytic solution is, for example, a method using a nozzle. For example, the nozzle is placed near the unsealed portion, and the electrolytic solution is caused to flow out from the nozzle, so that the electrolytic solution can be injected into the intermediate member sealed by the outer packaging body. Further, as then electrolytic solution in this disclosure, a well-known electrolytic solution can be used. The outflow direction of the electrolytic solution is not limited in particular. However, the outflow direction may be a vertically downward direction as illustrated in FIG. 2B, for example. The state where "the outflow direction of the electrolytic solution is the vertically downward direction" indicates that a direction where the angle formed between $D_A$ and $D_G$ is equal to or less than 30° in a case where $D_A$ indicates the outflow direction of the electrolytic solution, and $D_G$ indicates a direction where the gravity works. The angle formed between $D_A$ and $D_G$ may be equal to or less than 15° or may be equal to or less than 5°. Further, the outflow direction of the electrolytic solution may be the horizontal direction as illustrated in FIG. 3B, for example. The state where "the outflow direction of the electrolytic solution is the horizontal direction" indicates that a direction where the angle formed between $D_A$ and $D_H$ is equal to or less than 30° in a case where $D_H$ indicates the horizontal direction. The angle formed between $D_A$ and $D_H$ may be equal to or less than 15° or may be equal to or less than 5°.

3. Permeation Step

The permeation step in this disclosure is a step of causing the injected electrolytic solution to permeate the intermediate member. Further, the permeation step is a step of causing the electrolytic solution to permeate the intermediate member in a state (the arrangement state A) where the intermediate member is placed such that the first side is placed on the vertically lower side. The arrangement state A is defined as described above.

In the permeation step, the electrolytic solution (particularly, the electrolytic solution present in a dead space of a space covered with the outer packaging body) permeates the intermediate member (particularly, the separator in the power generation element). The pressure environment in the permeation step may be a normal pressure or may be a reduced pressure. Further, the atmosphere in the permeation step may be, for example, inert atmosphere. The permeation time is not limited particularly, but may be equal to or more than three hours or may be equal to or more than five hours, for example.

4. Gas Pocket Forming Step

The manufacturing method of the battery in this disclosure may include a gas pocket forming step of forming a gas pocket, between the injection step and the permeation step. By forming the gas pocket, it is possible to collect gas generated from the injected electrolytic solution. Further, by forming the gas pocket, it is possible to restrain water invasion.

FIG. 7A to FIG. 7F illustrate schematic side views illustrating the manufacturing method of the battery in this disclosure. More specifically, FIG. 7A to FIG. 7F illustrate schematic side views illustrating the manufacturing method including the gas pocket forming step. First, the intermediate member 40 illustrated in FIG. 7A is prepared. In FIG. 7A, the outer packaging body 30 includes the first sealing portion $S_a$ placed outwardly from the first side $S_1$, the second sealing portion $S_b$ placed outwardly from the second side $S_2$, the third sealing portion $S_c$ placed outwardly from the third side $S_3$, and the fourth sealing portion $S_d$ placed outwardly from the fourth side $S_4$. Further, the first end part of the third sealing portion $S_c$ is connected to the first sealing portion $S_a$, and the second end part of the third sealing portion $S_c$ is connected to the second sealing portion $S_b$. In the meantime, the first end part of the fourth sealing portion $S_d$ is connected to the first sealing portion $S_a$, but the second end part of the fourth sealing portion $S_d$ is not connected to the second sealing portion $S_b$. Further, the unsealed portion X is present between the second end part of the fourth sealing portion $S_d$ and the second sealing portion $S_b$.

Further, as illustrated in FIG. 7A, the first sealing portion $S_a$ is connected to a first extending portion $ES_a$ extending across the fourth sealing portion $S_d$ from the power generation element 10. Similarly, the second sealing portion $S_b$ is connected to a second extending portion $ES_b$ extending across the fourth sealing portion $S_d$ from the power generation element 10. The intermediate member 40 configured as such is placed such that the third side $S_3$ is placed on the vertically lower side (the arrangement state B).

Subsequently, as illustrated in FIG. 7B, the electrolytic solution 6 is injected from the unsealed portion X in the arrangement state B. Then, as illustrated in FIG. 7C, a temporarily sealing portion St connected to the first extending portion $ES_a$ and the second extending portion $ES_b$ is formed. Hereby, a gas pocket G constituted by the first extending portion $ES_a$, the second extending portion $ES_b$, the fourth sealing portion $S_d$, and the temporarily sealing portion $S_t$ is formed. The gas pocket G communicates with the power generation element 10 sealed by the outer packaging body 30 via the unsealed portion X. Subsequently, as illustrated in FIG. 7D, the intermediate member 40 in which the electrolytic solution 6 is injected is placed such that the first side $S_1$ is placed on the vertically lower side (the arrangement state A). That is, the intermediate member 40 is rotated so that the intermediate member 40 is changed from the arrangement state B illustrated in FIG. 7C to the arrangement state A illustrated in FIG. 7D. By maintaining the arrangement state A, the electrolytic solution 6 is caused to permeate the whole intermediate member 40. Then, as illustrated in FIG. 7E, the unsealed portion X is sealed. After that, the gas pocket G is cut, and hereby, the battery 100 is Obtained.

5. Inlet Sealing Step

The manufacturing method of the battery in this disclosure may further include an inlet sealing step of sealing the unsealed portion after the permeation step. A method of sealing the unsealed portion may be, for example, a method similar to the method of forming the sealing portion as described above.

6. Battery

The battery in this disclosure may be configured to cool the power generation element via at least either of the first collector terminal and the second collector terminal. For example, at least either of the first collector terminal and the second collector terminal may be thermally connected to a cooling device. The cooling device may be, for example, a device using refrigerant or a device using an electronic cooling element such as a Peltier element.

The type of the battery in this disclosure is not limited in particular, but the battery in this disclosure is typically a lithium-ion secondary battery. Further, the purpose of the battery in this disclosure is not limited in particular. However, the battery in this disclosure is used for a power supply of a vehicle such as a hybrid electric vehicle (REV), a battery electric vehicle (BEV), a gasoline-fueled automobile, or a diesel powered automobile, for example. Particularly, it is preferable that the battery in this disclosure be used for a drive power supply of a hybrid electric vehicle or a battery electric vehicle. Further, the battery in this disclosure may be used as a power supply of a movable body, (e.g., a train, a vessel, an aircraft) other than the vehicle or may be used as a power supply of an electric appliance such as an information processing device.

This disclosure is not limited to the above embodiment. The above embodiment is just an example and has a configuration substantially the same as the technical idea described in claims in this disclosure, and any configuration that can yield similar effects is included the technical scope of this disclosure.

What is claimed is:

1. A manufacturing method of a battery, the manufacturing method comprising:

a preparing step of preparing an intermediate member including an electrode body sealed by an outer packaging body and an unsealed portion via which an electrolytic solution is to be injected;

an injection step of injecting the electrolytic solution into the intermediate member via the unsealed portion;

a permeation step of causing the injected electrolytic solution to permeate the intermediate member; and an inlet sealing step of sealing the unsealed portion after the permeation step, wherein:

the electrode body includes a power generation element having a rectangular shape in a plan view, and a first collector terminal and a second collector terminal connected to the power generation element;

in the plan view, the power generation element has a first side and a second side corresponding to long sides in the rectangular shape of the power generation element, and a third the first collector terminal and the second collector terminal are placed on the first side and on the second side, respectively;

in the permeation step, the electrolytic solution is caused to permeate the intermediate member in a first arrangement state where the intermediate member is placed such that the first side is placed on a vertically lower side of the intermediate member;

in the injection step, the electrolytic solution is injected into the intermediate member in a second arrangement state where the intermediate member is placed such that the third side is placed on the vertically lower side of the intermediate member;

the unsealed portion is provided on a fourth sealing portion of the outer packaging body placed outwardly from the fourth side at a position higher than a middle point of the fourth sealing portion when in the first arrangement state, and the unsealed portion is unsealed in the permeation step; and the intermediate member is rotated between the injection step and the permeation step so that the intermediate member is changed from the second arrangement state to the first arrangement state.

2. The manufacturing method according to claim 1, wherein, in the first arrangement state, a position of the unsealed portion is higher than a position of the second side.

3. The manufacturing method according to claim 1, wherein:

in the plan view, the outer packaging body includes a first sealing portion placed outwardly from the first side, a second sealing portion placed outwardly from the second side, a third sealing portion placed outwardly from the third side, and a fourth sealing portion placed outwardly from the fourth side;

the first sealing portion is connected to a first extending portion extending across the fourth sealing portion from the power generation element;

the second sealing portion is connected to a second extending portion extending across the fourth sealing portion from the power generation element; and the manufacturing method includes, between the injection step and the permeation step, a gas pocket forming step of forming a gas pocket constituted by the first extending portion, the second extending portion, the fourth sealing portion, and a temporarily sealing portion by forming the temporarily sealing portion connected to the first extending portion and the second extending portion.

4. The manufacturing method according to claim 1, wherein the unsealed portion is provided between an end part of the fourth sealing portion and a second sealing portion of the outer packaging body placed outwardly from the second side.

5. The manufacturing method according to claim 1, wherein the unsealed portion is placed on a line segment that connects a first intersecting point between the fourth sealing portion and a first sealing portion of the outer packaging body placed outwardly from the first side with a second intersecting point between the fourth sealing portion and a second sealing portion of the outer packaging body placed outwardly from the second side.

6. The manufacturing method according to claim 1, wherein a pressure environment in the permeation step is a normal atmospheric pressure.

7. The manufacturing method according to claim 1, wherein a duration of the permeation step is equal to or more than three hours.

8. The manufacturing method according to claim 7, wherein the duration of the permeation step is equal to or more than five hours.

9. The manufacturing method according to claim 1, wherein a third sealing portion of the outer packaging body placed outwardly from the third side is a folded portion obtained by folding the outer packaging body.

10. The manufacturing method according to claim 9, wherein an aspect ratio of the power generation element is equal to or more than 2.0.

11. The manufacturing method according to claim 9, wherein an aspect ratio of the power generation element is equal to or less than 10.0.

12. The manufacturing method according to claim 11, wherein the aspect ratio of the power generation element is equal to or less than 5.0.

13. The manufacturing method according to claim 1, wherein an aspect ratio of the power generation element is equal to or more than 1.1.

14. The manufacturing method according to claim 13, wherein the aspect ratio is equal to or more than 1.5.

15. The manufacturing method according to claim 1, wherein the preparing step includes a sealing step of forming a first sealing portion placed outwardly of the entire first side, a second sealing portion placed outwardly of the entire second side, a third sealing portion placed outwardly of the entire third side, and the fourth sealing portion placed outwardly of the fourth side except the unsealed portion.

* * * * *